Jan. 5, 1965 L. J. WUBBE 3,163,877
ARM AND BLADE CONNECTOR
Filed June 29, 1962
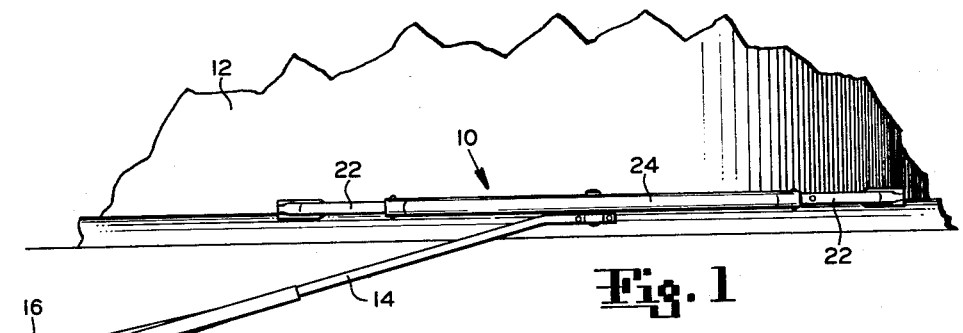
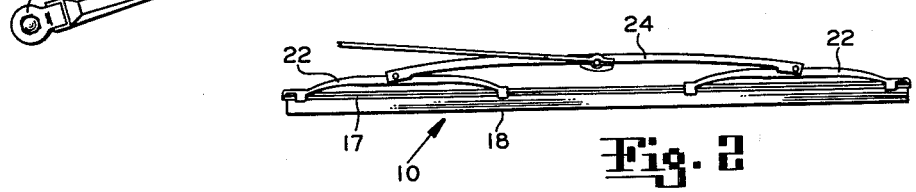
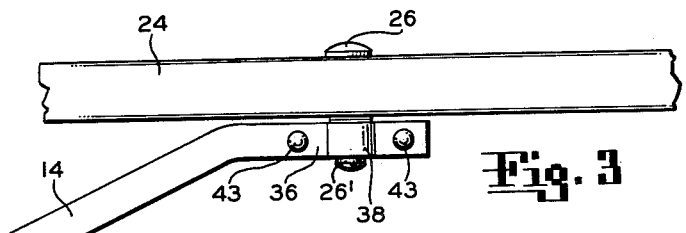
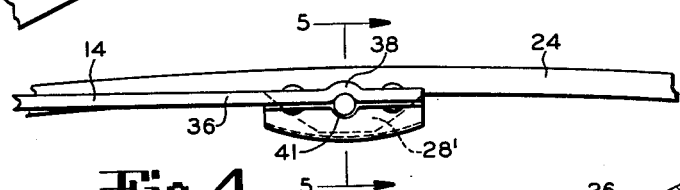
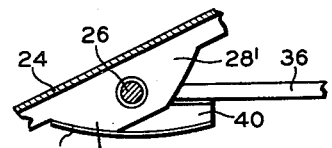
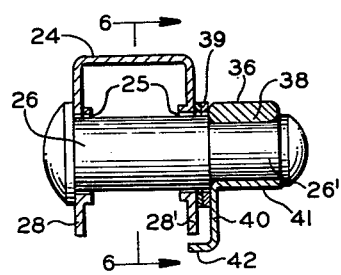
INVENTOR
LEO J. WUBBE
BY
ATTORNEY

# United States Patent Office 3,163,877
Patented Jan. 5, 1965

3,163,877
ARM AND BLADE CONNECTOR
Leo J. Wubbe, Beverly Shores, Ind., assignor to The Anderson Company, a corporation of Indiana
Filed June 29, 1962, Ser. No. 206,402
5 Claims. (Cl. 15—250.32)

This invention relates to a windshield wiper and is particularly concerned with establishing an improved connection between the wiper and the wiper carrying arm.

Windshield wiper arms have heretofore been attached to the superstructure of a windshield wiper blade in a manner to project upwardly or laterally from the side thereof. In the arrangements where the wiper arm projects laterally from the side of the superstructure, a lower silhouette is provided which does not obstruct the operator's forward vision through the windshield.

An object of this invention is to provide an improved arm-to-blade connection of the lateral type.

Another object of this invention is to provide an improved pivotal connection.

Another object of this invention is to provide a pivotal connection between the blade and arm employing cooperating cams on mating parts to control the pivotal movement of the blade relative to the arm.

In the drawings:

FIGURE 1 represents a frontal view of a wiper employing my invention in parked position along the lower edge of a windshield;

FIGURE 2 is a side view of the wiper shown in FIGURE 1;

FIGURE 3 is a plan view of the pivotal connection between the arm and superstructure;

FIGURE 4 is a side view of the structure of FIGURE 3;

FIGURE 5 is an enlarged cross-sectional view of FIGURE 4 taken along line 5—5 of FIGURE 4;

FIGURE 6 is a cross-sectional view of FIGURE 5 taken along line 6—6 and showing mating cams engaged in one pivotal position;

FIGURE 7 is similar to FIGURE 6 but shows the cams engaged in a reverse pivotal position.

FIGURE 1 discloses a windshield wiper, generally designated by the numeral 10, in position for wiping a curved windshield 12. Arm 14, including pivot head 16, is adapted to be pivotally connected to a pivot shaft (not shown) for oscillation therewith to move the wiper blade in an arcuate reciprocatory path across the windshield.

By referring to FIGURE 2, it is clear that the windshield wiper 10 comprises an elongate squeegee or wiping element 18 having a generally planar flexor or stay 17. The flexor 17 is generally flexible in one direction, but is relatively inflexible in a direction substantially perpendicular to the one direction. A superstructure for the windshield wiper blade comprises a pair of spaced-apart yokes 22 which have their ends connected to the flexor at spaced-apart locations along its linear extent. An intermediate portion of each of the secondary yokes 22 is adapted to be pivotally connected to opposite ends of a bridge member 24. The mid-portion of bridge 24 is adapted to receive the outer end of arm 14. It can be seen that pressure and motion applied to the bridge member 24 by arm 14 will be transmitted through the secondary yokes 22 and flexor 17 to the squeegee element 18 which is held in contact with a windshield surface. Bridge member 24 is channel shaped with depending flanges provided with a pair of transverse openings 25 near the mid-portion for freely pivotally receiving a pin 26 thereto. As shown in FIGURES 6 and 7, the opposed flanges of bridge 24 are provided with depending cam portions 28 and 28' surrounding openings 25. Each cam portion has a pair of spaced-apart arcuate surfaces.

Arm 14 has an obliquely disposed outer extremity 36 which is adapted to be operatively secured to the bridge 24 for limited pivotal movement therewith. Extremity 36 of arm 14 lies adjacent and generally parallel with bridge 24.

Pin 26 has one cylindrical portion adapted to be pivotally received in recesses 25 of the flanges of bridge 24. Pin 26 has a reduced diameter cylindrical portion 26' spaced axially therefrom which is adapted to be fixedly received by arm extremity 36. A cylindrically shaped recess 38 partially receives portion 26', while a cover 40, having a similar recess 41, is fixedly received opposite portion 36 by rivets 43 or other means to fixedly secure pin potion 26' therebetween. Heads on opposite ends of the pin maintain the parts axially assembled. The length of the cylindrical portions are so maintained to provide space for a pair of bronze or plastic bushings 39 therebetween to assure freedom of movement of arm 14 and bridge 24.

Cover 40 is provided with an inturned arcuate cam portion 42 disposed beneath both cams 28 or 28' for engagement with either whenever the bridge 24 is pivoted relative to the arm beyond a predetermined angularity as shown in FIGURES 6 and 7. FIGURE 5 discloses cam 42 disposed beneath cam 28' for the left-hand wiper on the driver's side, as shown in FIGURE 1; pin 26 and cam 42 lie under cam 28 for the right-hand wiper. As shown in FIGURES 6 and 7, arcuate cam or stop 42 engages either cam or stop 28 or 28' whenever the wiper is pivoted about pin 26 beyond a predetermined amount.

It is readily apparent that I have provided means for establishing a connection between the end of a wiper arm and a wiper blade superstructure, whereby the arm is attached to one side of the superstructure out of the vision of the vehicle driver and passenger. Cams are provided to maintain the blade within a predetermined pivotal angular relationship with the arm.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. A windshield wiper and arm assembly comprising in combination:
    a windshield wiper having an elongate flexible squeegee and a pressure-distributing superstructure therefor,
    an oscillatable pressure-applying wiper arm having one portion pivotally connected to the superstructure and another portion adapted to be connected to an oscillatable driving mechanism for driving the wiper across a windshield surface,
    said one portion of the arm extending at an oblique angle with respect to said another portion of the arm,
    said one portion disposed parallel with and to one side of said superstructure,
    said superstructure adapted to be pivotal about its connection in a plane substantially parallel to said one portion,
    and cam means on said one portion of the arm adapted to engage spaced-apart cam means on said superstructure for alternate engagement to prevent pivotal movement of the blade beyond a predetermined angle with respect to the one portion.
2. A windshield wiper and arm assembly comprising in combination:
    a pressure-applying arm having an outer extremity disposed along an axis at an oblique angle to an inner longitudinal portion of the arm,
    a wiper including a pressure-applying superstructure pivotally connected to the outer extremity of said arm and to a flexible wiping element for urging the wiping element into conformity with a windshield being wiped, said outer extremity of said arm being disposed entirely to one side of the vertical plane of said wiper and parallel therewith, a portion of said outer extremity having shoulder means underlying spaced-apart cam means on said superstructure below the pivotal connection thereto and adapted to engage either of said cam means to limit rocking of said superstructure relative to said outer extremity in a plane substantially parallel therewith.

3. The structure of claim 2 wherein an inturned arcuate surface defines said shoulder means.

4. The structure of claim 3 wherein the spaced-apart cam means comprises at least two arcuate surfaces adjacent said shoulder means.

5. A windshield wiper and arm assembly comprising in combination:

a windshield wiper including an elongate flexible blade and an articulated pressure-transmitting superstructure therefor for conforming the blade to an irregular surface of a windshield, a pressure-applying actuating arm having an outer end lying substantially parallel to said articulated pressure-transmitting superstructure and entirely to one side therefore and having an inner end adapted to be connected to a drive shaft, a portion of said articulated pressure-transmitting superstructure pivotally connected to said outer arm end on an axis transverse thereto to permit pivotal movement generally in a plane parallel to said outer arm, said outer end of said actuating arm and said portion of said superstructure each having complementary spaced stops for alternate engagement for limiting the extent of pivotal movement of said windshield wiper relative to said arm.

References Cited in the file of this patent

UNITED STATES PATENTS

| | | |
|---|---|---|
| 2,773,712 | Chambers | Dec. 11, 1956 |
| 2,973,542 | Horton | Mar. 7, 1961 |

FOREIGN PATENTS

| | | |
|---|---|---|
| 265.686 | Great Britain | Feb. 10, 1927 |